United States Patent Office 3,516,851
Patented June 23, 1970

3,516,851
METHOD OF TREATMENT OF A POROUS SUB-
STANCE, ESPECIALLY TREATMENT OF SEMI-
SOLID WALLBOARD WITH FIRE- AND OTHER
EXTINGUISHING SUBSTANCES
Anjal Aulis Kaila, Heinola, Finland, assignor to Heinolan
Faneritehdas, Zachariassen & Co., Heinola, Finland
Filed Aug. 15, 1967, Ser. No. 660,804
Claims priority, application Finland, Apr. 25, 1967,
1,209/67
Int. Cl. B50c 1/00
U.S. Cl. 117—111
6 Claims

ABSTRACT OF THE DISCLOSURE

A method for the treatment of fibreboard with a protective substance selected from the group consisting of flame resistant, rot and mould resistant substances and insecticides.
The method comprises impregnating the fibreboard with a solution of the protective substance by using presses, at least one press surface thereof being provided with a porous cushion, into which said solution is impregnated, and from which said solution is absorbed under pressure into said fibre board.

---

Figure 1:
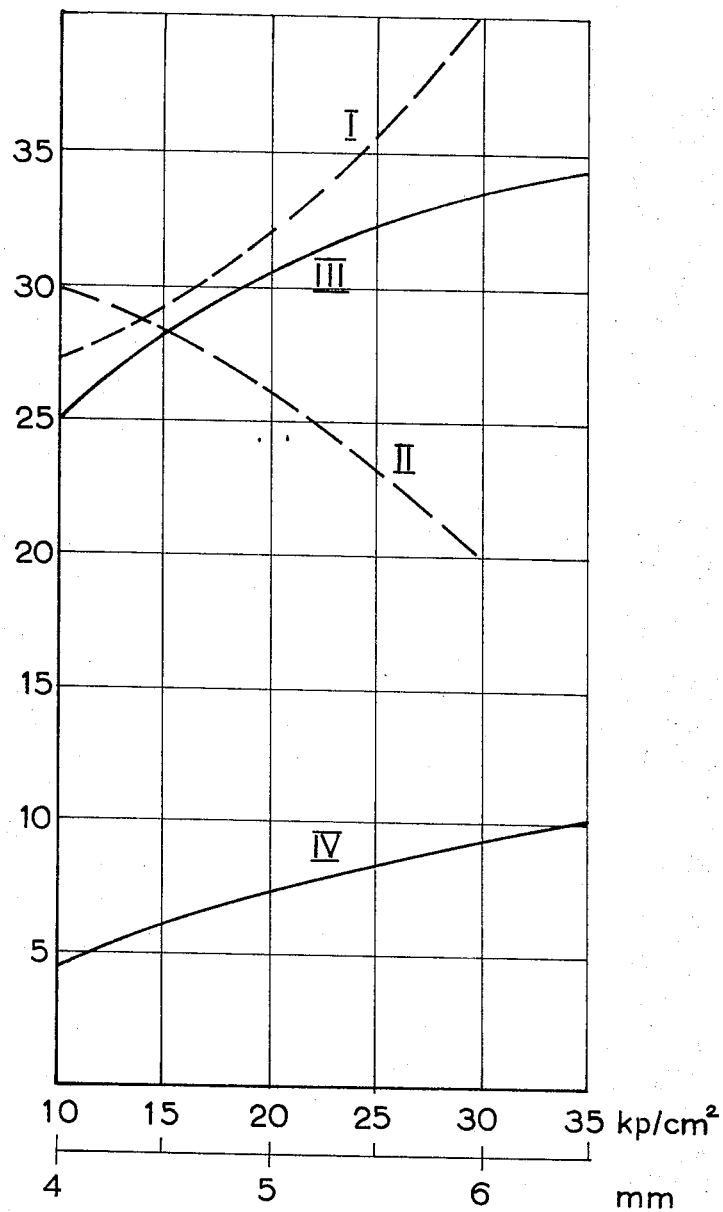

The present invention relates to a method of treatment of a porous substance, especially treatment of semisolid wallboard, with fire-mould and rot-extinguishers and/or insecticides, in which treatment the porous substances are impregnation of wallboard such as fibreboard with the with or without using pressure and/or vacuum.

There exists different kinds of fire-extinguishing substances and compositions by aid of which there can be produced products having the fireproof qualities. As a continuing problem there has been the question how the impregnation of wallboard such as fibreboard with the fire-extinguishing substances should be carried on.

In connection with the production of wallboard by using the wet process efforts have been made to let the wallboard absorb the fire-extinguishing substance from the water solution before the formation of the wallboard, but this has not met with any success when using an open water circulation system.

Thus the best method known in practice is carried out so that the aqueous solution of the fire-extinguishing substances is by absorption in a closed up condition by aid of pressure and/or vacuum impregnated into a ready made wallboard. This method is, however, very slow, expensive and complicated, and also several alike methods are already known.

As is generally known, there now is being demanded more and more strict rules with regard to building materials, such as for instance the fireproof properties claimed for wallboards. The prevailing high demands on the market as regards the prices and the quality, an extra treatment for making the product fireproof cannot be carried out at the cost of the other good properties already found in the products and the essential increase in prices. This being the case, the hereabove described, known, complicated, slow and expensive method is not of any satisfactory and practical importance in industrial production.

By means of the present invention there is created a method according to which the fire-extinguishing substances as well as other extinguishing substances for preventing mould and rot in the products, and/or insecticides, can impregnate especially the half-solid wallboards, quickly and effectively in such quantities which so far have proved impossible to carry out especially when the impregnation concerns thicker wallboards.

The method according to the invention is thus mainly characterized by the feature that the impregnation of these products is carried out by using one or several presses, in which either the surface of the bottom press and/or the surface of both the bottom and the top presses is provided with porous cushion or padding. This padding may be of felt, porous rubber, spongy plastic material or a combination of these.

As a press there may be used a flat or a form press covered with porous material and arranged into a suitable tub or vessel containing the solution of the extinguishing substances. The other advantages according to the invention are, however, most suitably carried out by using one or several roller pairs, in which either the bottom roller or even the top roller is wholly sunk into the vessel containing the solution of the extinguishing substances, at which the roller surfaces or only the surface of one of the rollers is provided with porous padding.

In FIG. 1 there is referred to comparative experimental tests, the results being determined in the container by means of a flat faced press, (a) The percentage of salt absorbed by the wallboard as the thickness function, and (b) The percentage of salt as the pressure function.

(a) The percentage of salt as the thickness function: In the hereto attached graphical illustration the curve I indicates the quantity of salt when using a flat press provided with felt padding. The curve II indicates the contents of salt when the press is without padding. In the carried out tests there was used half-solid wallboard, the density of which was 0.66 g./cm.$^3$, compression load 20 kp./cm.$^2$, temperature of solution 90–100° C., turbidity abt. 40% and the temperature of press-plates 140° C. The pressing period was 1 sec.

The advantages of the invention are appearing especially when treating thicker boards. When the thickness is 6 mm. there is in using padding attained a salt content of 40% and without padding 20%. The difference is quite significant and furthermore it can be proved that the curve I (with padding) is continually rising, whereas the curve II continually falls while the thickness increases.

(b) The percentage of salt as the pressure function: In the graphical illustration of FIG. 1 the curve III indicates the quantity of salt when using padding and the curve IV the quantity of salt without padding. In the performed tests there was used half-solid wallboard of 12 mm. with a density of 0.64 g./cm.$^3$. The curves show most clearly the achieved advantages of the present invention, because the difference in the contents of salt exist in an area of about 20–27%, depending on the pressure.

Figure 2:
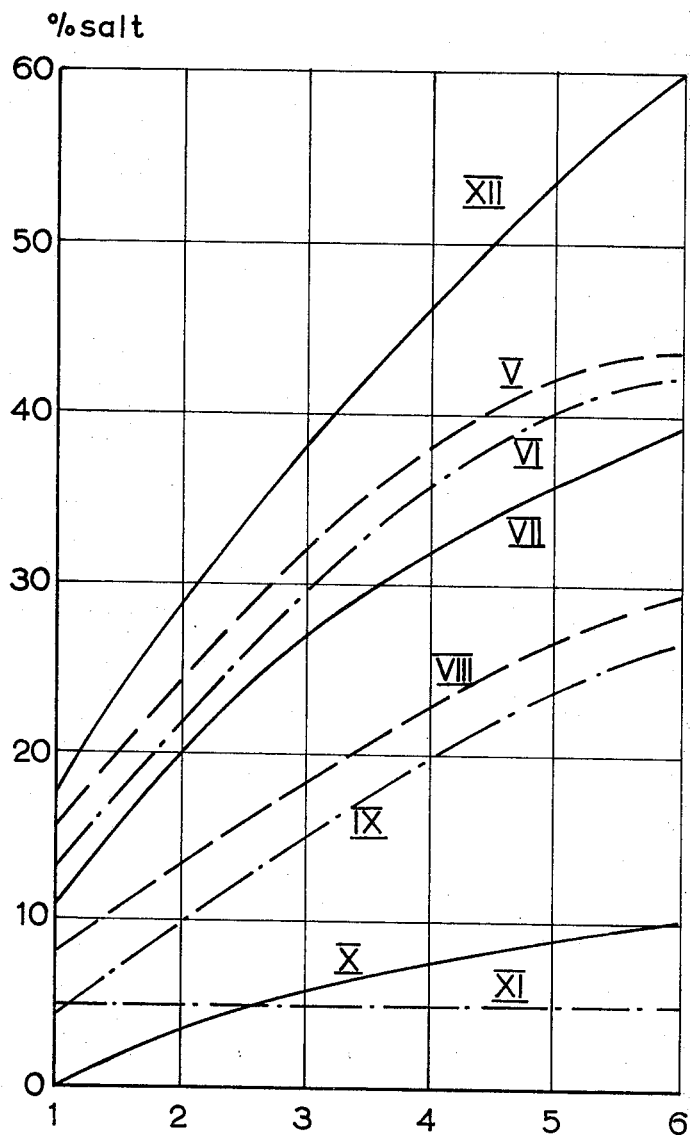

The graphical illustration according to FIG. 2 shows a series of tests proving the action of the quantity of salt that had been absorbed by the wallboard, the tests being carried out by using felt padding on both the top and the bottom roller. The lower roller was rotating in the salt solution and over this roller was the salt solution led by aid of an overflow container. In all of these tests the temperature of the solution was 85–95° C., the salt contents of the solution about 40%, the pressure on the rollers 20 kp./cm.² and the driving speed 20 m./min. The thickness of the wallboards varied within an area of 2.5–12 mm.

By using six roller pairs a hard wallboard (curve XI) absorbs only 5% (same result as when using only one roller pair), whereas on the other hand a wallboard of the same thickness but half-hard with the density of 0.67 g./cm.³ absorbs nearly 30% and when the density is 0.50 g./cm.³ it absorbs even up to 60%. Should the density be still reduced, a still greater percentage of salt can be expected to be absorbed.

How great the amount of the absorbed salts has to do depends naturally on the demanded protective capacity of the extinguisher. For example, in order to obtain an extinguishing protection for an insecticide, even salt content of only 5% can be sufficient, whereas on the other hand, in order to obtain fire-extinguishing protection for the product, the required salt contents become considerably greater. By using the method according to the invention there is possible to adjust the required salt percentage within an extensive area.

As a porous product there may besides the wallboard used for the testing series even be used chipboard, veneer leaf, stave leaf, wood etc.

In FIG. 2 the vertical axis indicates the absorbed salt quantity taken in percents of the original dry weight and the horizontal axis the number of the roller pairs.

With reference to the numbering of the curves in FIG. 2 the examined wallboards were as follows:

TABLE

| Curve | Thickness, mm. | Density, g./cm.³ | Wallboard |
|---|---|---|---|
| V | 2.5 | 0.67 | Half-hard. |
| VI | 5 | 0.70 | Do. |
| VII | 6 | 0.68 | Do. |
| VIII | 8 | 0.67 | Do. |
| IX | 10 | 0.67 | Do. |
| X | 12 | 0.67 | Do. |
| XII | 8 | 0.50 | Do. |
| XI | 8 | 0.88 | Hard. |

The above results prove that there according to the invention is attained very favourable results in the treatment of porous products.

The quick absorption of the salts especially into the thick wallboard in considerable quantities when using padding in the pressing phase was quite a surprising and unexpected result. As it so far has proved to be the most difficult problem to find for the extinguishing solutions a quick and inexpensive absorption process for wallboards in a sufficiently big quantity, there has by the present invention in this line of production achieved an essential technical improvement.

The treatment of the products with extinguishing substances according to the invention may also be carried out as an intermediate phase between the pressing and the hardening phase of the wallboard. In this case the board is impregnated by the protective substance directly in its hot state as it leaves the wallboard press by means of one or several pairs of rollers, during which procedure the protecting substances are suitably kept heated by aid of the lower and the upper heating vat, for example, at a temperature of 40–180° C. After impregnation the board is led between the washing and/or the brushing rollers in order to remove the salt layer from the surface of the board before hardening.

While the lower roller, in the vat where it rotates, obtains its supply of the protective solution of the salts from the vat, at the upper end can be led a flow of the protective solution on the upper roller or on the top surface of the board. The roller pair can be arranged into their container thus that their front and the rear end is situated higher than the middle part, in which the boards in order to avoid loss of solution, are transported along in a concave from through the rollers and the container. There may be even one or several rollers hollow with a perforated surface, whereby it is made possible to arrange vacuum or pressure inside of such roller, depending on whether the roller is placed on the top or the bottom surface of the liquid in the container.

As preservative substance there may be used any known protecting substances. For example, as fire-extinguishing substance there may be used known inorganic and/or synthetic resins as an aqueous solution and eventually even with diluents. It is also possible with separate rollers to feed different protecting substances, which eventually will be mutually reacting in the wallboard. If desired, the product can be treated with a surface activating agent, either before the treatment with the protecting solution or thus that the surface activating substance is added to the first protecting solution (treatment 1 in the roller pair). In case the salts in the protecting solution are too hygroscopic, the product can during the finishing phase of saturation be condensed or covered with a suitable surface by an adaptable surfacing treatment.

In any case the product can after a treatment according to the invention with the protecting substances before the final process be led continuously, eventually by means of temporary heating, through the surfacing treatment, which satisfactorily also can be carried out by means of a roller pair, in which case the covering substance consists of the preservative or a suitable paint, or of impregnated paper or impregnated plastic.

The method according to the invention includes the possibility to adjust the quality of the preservative, the period for treatment, the temperature of the solution and the product, the strength, the compression load of the rollers and the number of these and the required qualities needed for the paddings for the treatment in question.

As already stated above, the method according to the invention can be adapted as a temporary phase for any kind of suitable porous manufacture in their treatment with substances used for fire—mould and rot-extinguishers and/or for those used for insecticides.

I claim:
1. A method for the treatment of fibreboard with a protective substance selected from flame resistant, rot resistant, and mould resistant substances and insecticides, comprising: providing at least one press including mutually opposed press surfaces, at least one of which has a porous cushion provided thereon; impregnating said porous cushion with a solution of said protective substance; and pressing said fibreboard between said press surfaces thereby causing said solution to be absorbed into said fibreboard.

2. The method of claim 1 wherein said fibreboard is impregnated with said protective substance upon its emergence from a fibreboard press in a heated condition.

3. The method of claim 1 wherein the material forming said porous cushion is selected from the group comprising felt, porous rubber, and foam plastic.

4. The method of claim 1 wherein said press surfaces comprise a pair of rotating rollers, the surafce of at least one roller being provided with a porous cushion.

5. A method for the treatment of fibreboard with a protective substance selected from flame resistant, rot resistant, and mould resistant substances, and insecticides comprising: providing a flat press, at least one press surface of which is provided with a porous cushion and is located in a bath containing a solution of said protective substance; pressing said fibreboard between said press surafces, thereby impregnating said protective substance into said fibreboard.

6. A method for the treatment of porous wallboard with a protective substance selected from flame resistant, rot resistant, and mould resistant substances and insecticides, comprising: providing at least one press including mutually opposed press surfaces, at least one of which has a porous cushion provided thereon; impregnating said porous cushion with a solution of said protective substance; and pressing said porous wallboard between said press surfaces thereby causing said solution to be absorbed into said porous wallboard.

References Cited

UNITED STATES PATENTS

| | | | |
|---|---|---|---|
| 1,858,111 | 5/1932 | Rees | 118—410 |
| 1,933,837 | 11/1933 | Arnold. | |
| 2,117,200 | 5/1938 | Miller | 117—112 |
| 2,159,587 | 5/1939 | Greider et al. | |
| 2,219,663 | 10/1940 | Schuster. | |
| 2,684,047 | 7/1954 | Walker | 118—257 X |
| 2,994,620 | 8/1961 | Franck et al. | 117—147 X |
| 3,066,046 | 11/1962 | Walton. | |
| 3,119,169 | 1/1964 | Holbrook | 117—98 X |
| 3,125,461 | 3/1964 | Hoffmann | 118—257 X |
| 3,219,473 | 11/1965 | Dimond | 117—102 X |

RALPH S. KENDALL, Primary Examiner.

U.S. Cl. X.R.

117—112, 136; 118—249, 264